United States Patent
Macwan

(10) Patent No.: US 7,953,792 B2
(45) Date of Patent: May 31, 2011

(54) METHOD AND SYSTEM FOR CONTENT DISTRIBUTION NETWORK PERFORMANCE AND QUALITY MEASUREMENT

(75) Inventor: Sanjay Macwan, Marlboro, NJ (US)

(73) Assignee: AT&T Intellectual Property I, LP, Reno, NV (US)

( * ) Notice: Subject to any disclaimer, the term of this patent is extended or adjusted under 35 U.S.C. 154(b) by 192 days.

(21) Appl. No.: 12/277,087

(22) Filed: Nov. 24, 2008

(65) Prior Publication Data

US 2010/0128918 A1    May 27, 2010

(51) Int. Cl.
    *G06F 15/16*    (2006.01)
(52) U.S. Cl. ......... 709/203; 709/217; 709/223; 709/224
(58) Field of Classification Search .................. 709/203, 709/217, 219, 223, 224, 231; 713/180, 193
    See application file for complete search history.

(56) References Cited

U.S. PATENT DOCUMENTS

| | | | |
|---|---|---|---|
| 6,286,001 B1 | 9/2001 | Walker et al. | |
| 6,769,061 B1 | 7/2004 | Ahern | |
| 7,181,523 B2 | 2/2007 | Sim | |
| 7,231,442 B2 | 6/2007 | Chen | |
| 7,392,393 B2 * | 6/2008 | Taki | 713/176 |
| 2005/0021706 A1 | 1/2005 | Maggi et al. | |
| 2005/0021972 A1 * | 1/2005 | Levi et al. | 713/176 |
| 2006/0095854 A1 * | 5/2006 | Funk et al. | 715/749 |
| 2008/0155061 A1 * | 6/2008 | Afergan et al. | 709/218 |
| 2008/0307301 A1 * | 12/2008 | Decker et al. | 715/241 |
| 2009/0094226 A1 * | 4/2009 | Lim et al. | 707/5 |
| 2009/0193097 A1 * | 7/2009 | Gassewitz et al. | 709/218 |

* cited by examiner

Primary Examiner — Lashonda T Jacobs
(74) Attorney, Agent, or Firm — Larson Newman, LLP

(57) ABSTRACT

A content delivery system includes an upload module, a content delivery module, and a quality assurance module. The upload module is configured to receive content from a content provider, and generate an upload signature for the content as received from the content provider. The content delivery module is configured to receive a request for the content from a client system, and provide the content to the client system. The quality assurance module is configured to generate a download signature for the content as delivered to the client, and compare the upload signature and the download signature. When the upload signature and the download signature do not match, the quality assurance module is further configured to generate an alert.

22 Claims, 5 Drawing Sheets

METHOD AND SYSTEM FOR CONTENT DISTRIBUTION NETWORK PERFORMANCE AND QUALITY MEASUREMENT

FIELD OF THE DISCLOSURE

The present disclosure generally relates to communications networks, and more particularly relates to a method and system for Content Distribution Network (CDN) performance and quality measurement.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to an edge server situated closer to the client issuing the request. CDNs either co-locate edge servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
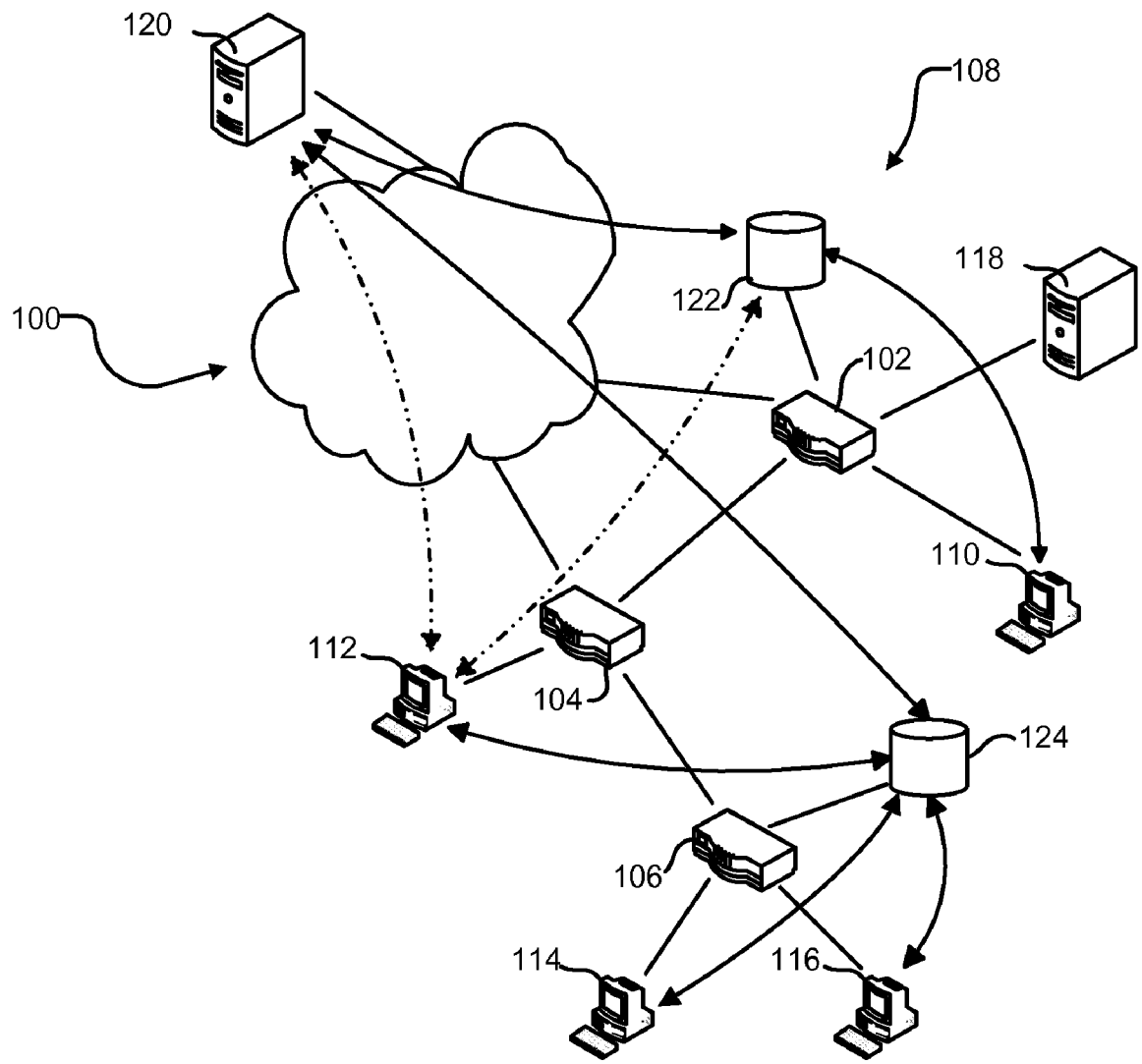
FIG. 1 is a diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphic, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include edge servers 122 and 124 replicating content on the server 120 that can be located more closely within the network to the client systems 110, 112, 114, and 116. Edge server 122 can link to router 102, and edge server 124 can link to router 106. Client systems 110, 112, 114, and 116 can be assigned edge server 122 or 124 to decrease the time needed to retrieve information, such as by selecting the edge server closer to the particular client system. The network distance between an edge server and client system can be determined by network cost and access time. As such, the effective network distance between the edge server and the client system may be different from the geographic distance.

When assigning edge servers 122 and 124 to client systems 110 through 116, the edge server closest to the client can be selected. The closest edge server may be the edge server having a shortest network distance, a lowest network cost, a lowest network latency, a highest link capacity, or any combination thereof Client system 110 can be assigned edge server 122, and client systems 114 and 116 can be assigned to edge server 124. The network costs of assigning client system 112 to either of edge server 122 or 124 may be substantially identical. When the network costs associated with the link between router 102 and router 104 are marginally lower than the network costs associated with the link between router 104 and router 106, client 112 may be assigned to edge server 124.

Client system 112 may send a request for information to edge server 124. If edge server 124 has the information stored in a cache, it can provide the information to client system 112. This can decrease the distance the information travels and reduce the time to retrieve the information. Alternatively, when edge server 124 does not have the information, it can retrieve the information from server 120 prior to providing the information to the client system 112. In an embodiment, edge server 124 may attempt to retrieve the information from edge server 122 prior to retrieving the information from server 120. The edge server 124 may retrieve the information from the server 120 only once, reducing the load on server 120 and network 100 such as, for example, when client system 114 requests the same information.

Edge server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost savings and time savings of providing content from the cache, the most popular content may be stored in the cache, while less popular content is retrieved from server 120.

In an embodiment, network problems may prevent the propagation of content through the CDN, resulting in a user receiving incomplete or stale content. For example, an edge server may not be able to retrieve content from another edge server or from an origin server. In another example, the edge server providing the content to the user may not be aware that a new version of the content is available, resulting in stale content being provided to the user. It is desirable to identify and correct problems impacting the user experience relatively quickly in order to minimize the number of users affected.

Figure 2:
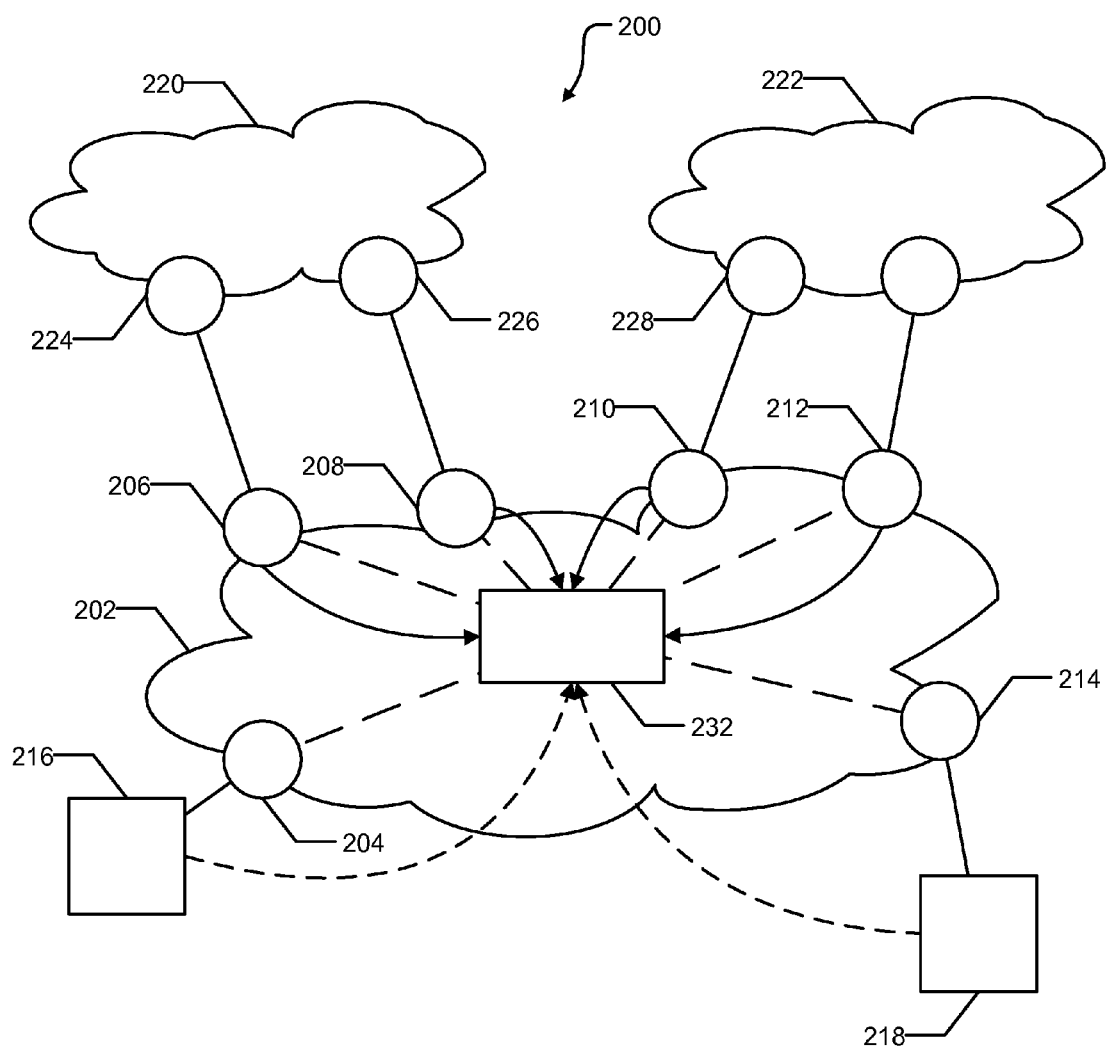
FIG. 2 is block diagram illustrating an anycast CDN system in accordance with one embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204 through 214. The provider edge routers 204 through 214 can serve as ingress points for traffic destined for the CDN provider network 202, and egress points for traffic from the CDN provider network 202 destined for the rest of the Internet. The anycast CDN system 200 can further include edge servers 216 and 218. Edge server 216 can receive traffic from the CDN provider network 202 through provider edge router 204, and edge server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either edge server 216 or 218.

Anycast CDN system 200 can also include a route controller 232. The route controller 232 can exchange routes with provider edge routers 206 through 212 within the CDN provider network 202. As such, the route controller 232 can influence the routes selected by the provider edge routers 206 through 212. Additionally, the route controller 232 can receive load information from edge servers 216 and 218.

Edge servers 216 and 218 can advertise, such as through Border Gateway Protocol (BGP), a shared anycast address to the CDN provider network 202, specifically to provider edge routers 204 and 214. Provider edge routers 204 and 214 can advertise the anycast address to the route controller 232. The route controller 232 can provide a route to the anycast address to each of the provider edge routers 206 though 212. Provider edge routers 206 through 212 can direct traffic addressed to the anycast address to either of the edge servers 216 and 218 based on the routes provided by the route controller 232. Additionally, the provider edge routers 206 through 212 can advertise the anycast address to AS 220 and AS 222. The route controller 232 can manipulate the route provided to provider edge routers 206 through 212 based on the load on the edge servers 216 and 218, network bandwidth, network cost, network distance, or any combination thereof. Altering the route to the anycast address can change which of edge servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. When anycast traffic from the same client system enters the CDN provider network 202 at both provider edge routers 206 and 208, portions of the traffic may be directed to different edge servers 216 and 218. Persistent and/or secure connections may be disrupted when portions of the traffic are sent to different edge servers 216 and 218. As such, it is undesirable to provide an anycast addresses to client systems within an unstable network.

Figure 3:
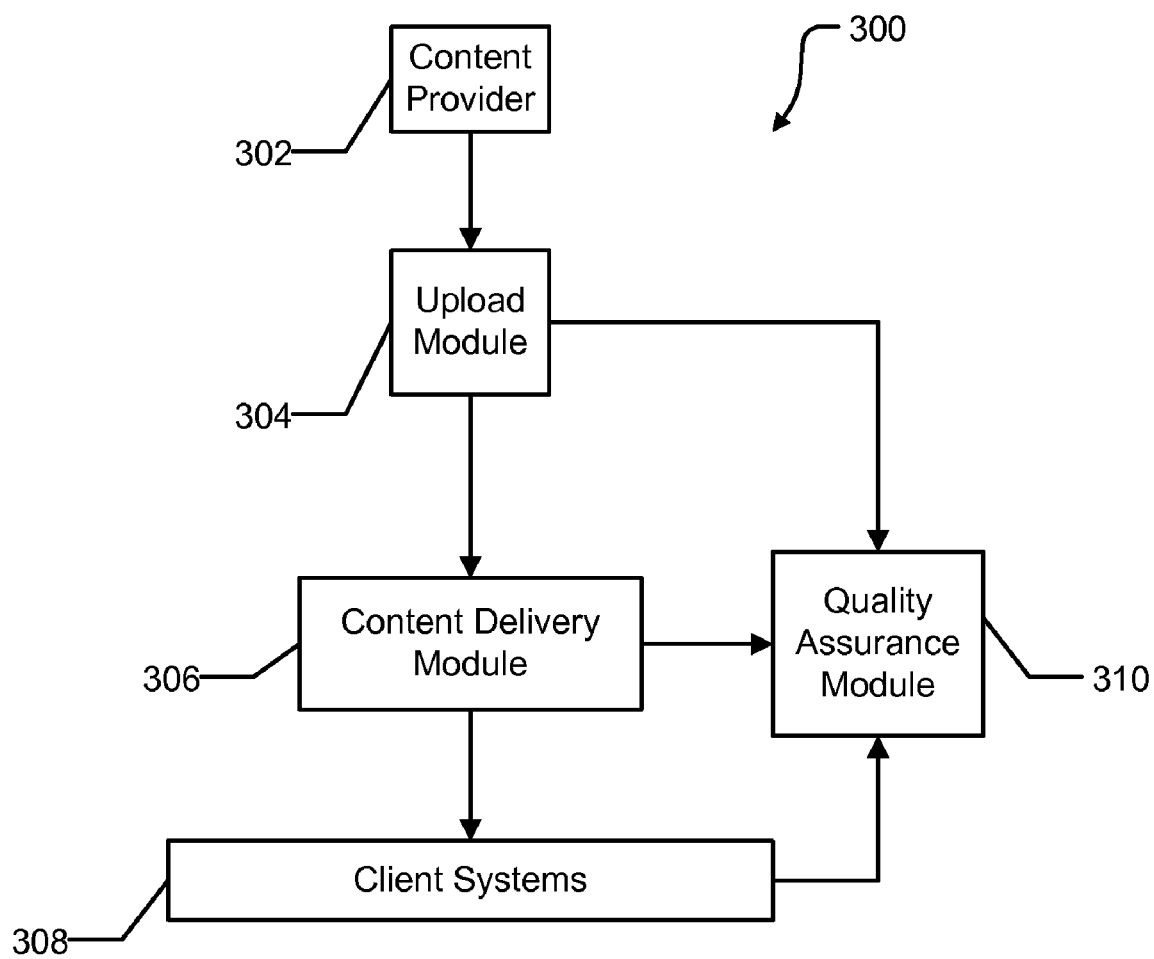
FIG. 3 is block diagram illustrating another CDN system in accordance with one embodiment of the present disclosure.

FIG. 3 illustrates another embodiment of a CDN system 300 that can be in conjunction with communications network 100 and/or anycast CDN system 200. A content provider 302 can upload content to the CDN system 300 through an upload module 304. The upload module 304 can distribute the content to the content delivery module 306 which can distribute the content to client systems 308 requesting the content. The content may be distributed to the content delivery module 306 prior to a request from client systems 308 and in response to a request from client systems 308.

In an embodiment, the upload module 304 can generate an upload signature representing the content as received by the upload module 304. Similarly, the content delivery module 306 can generate a download signature representing the content as provided to the client systems 308. The upload signature and the download signature can be provided to a quality assurance module 310. In an embodiment, client systems 308 may generate a download signature of the content as received and provide the download signature to the quality assurance module 310. The quality assurance module 310 can compare the upload and download signatures for the content and determine if the content experience provided to the client systems 308 matches the experience intended by the content provider. If the upload and download signatures do not match, the quality assurance module can generate an alert including notifying CDN support staff of the issue. Preferably, the CDN support staff can promptly resolve the issue.

The upload module 304, the content delivery module 306, and the quality assurance module 310 can be implemented in hardware, software, or any combination thereof. Each module may include one or more computer systems. When a module includes more than one computer system, the functions of the module can be distributed across the multiple computer systems in a symmetric manner, i.e., each computer system performs the same type of tasks, or in an asymmetric manner, i.e., two computer systems of the module may perform different tasks.

Figure 4:
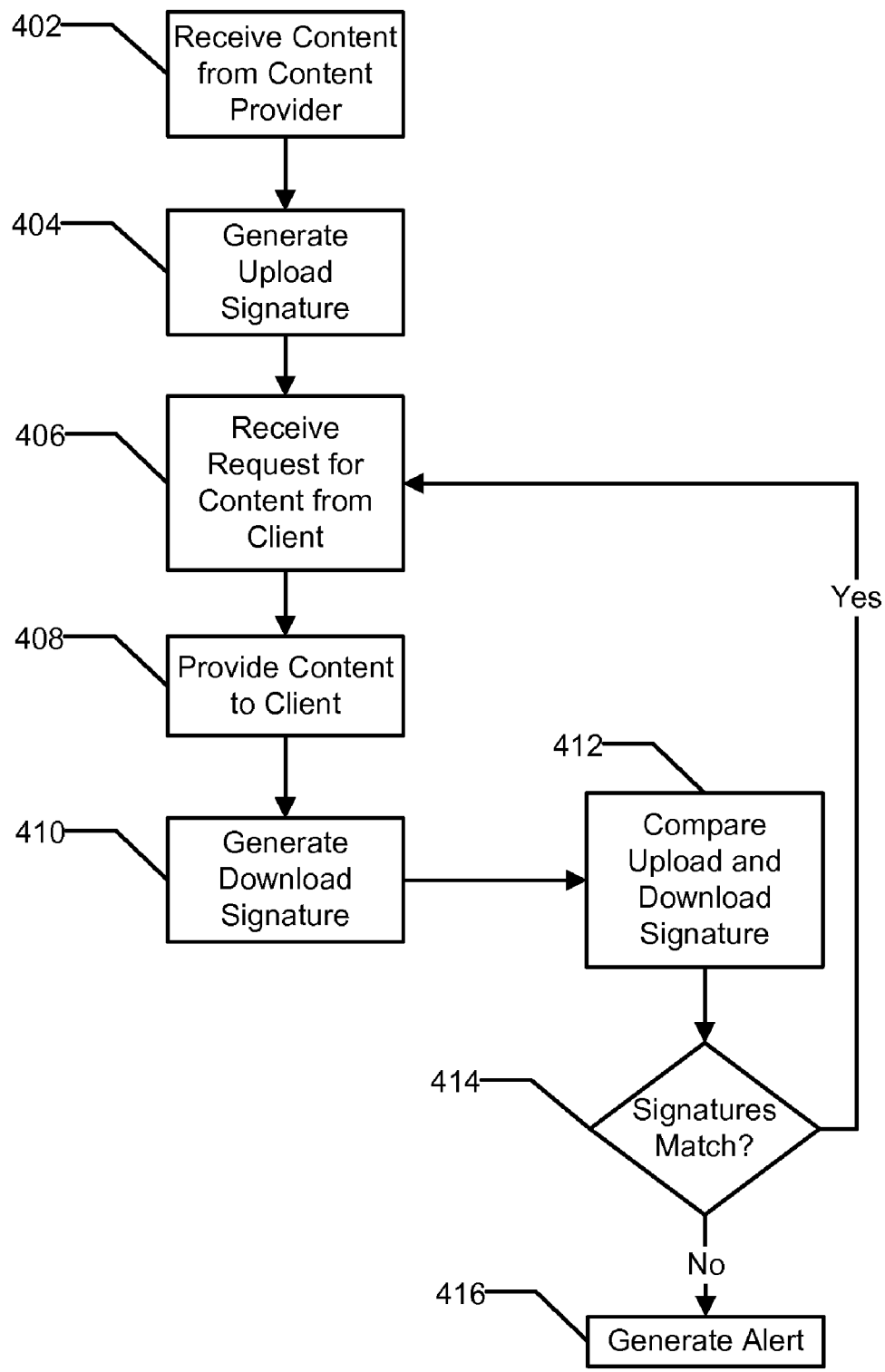
FIG. 4 is a flow diagram illustrating a method of measuring performance and quality of a CDN.

FIG. 4 illustrates a method of monitoring the quality of a CDN, such as CDN 200. At 402, the CDN receives content from a content provider. For example, the content can be a web page with several embedded content objects, such a multimedia content, image content, textual content, and the like. At 404, an upload signature can be generated for the content. The upload signature can be a representation of the content as received from the content provider by the CDN. The signature can be derived from a variety of attributes including a size of the content, a length of play of audio or video content, a format of the content, a hash of the content, a location within a web page where the content appears, a digital watermark embedded in the content, other content properties, and the like. In an embodiment, the upload signature can include a separate signature for each embedded content object. In another embodiment, the upload signature can include a combined signature for the content including any embedded objects. In yet another embodiment, the content signature can be a signature generated through the combination of the signatures for each embedded object.

At 406, the CDN can receive a request for the content from a client system, such as client system 110. At 408, an edge server of the CDN, such as edge server 122, can provide the content to the client system. At 410, a download signature can be generated for the content. The download signature can be a representation of the content as provided by the CDN to the client system. In an embodiment, the download signature can be determined by the edge server providing the content or by the client system. In an embodiment where multiple edge servers each provide different portions of the content to the client system, each edge server may generate a download signature for a portion of the content, and the download signatures may be combined to create a download signature for the entire content. In an embodiment, the edge servers or the client system may provide the download signature to a monitoring system for comparison to the upload signature. Alternatively, the edge servers may compare the download signature to the upload signature. In another embodiment, a plurality of monitoring systems can be distributed throughout the CDN, such as near the edge servers. At 412, the download signature and the upload signature can be compared to determine if the signatures match, as shown at 414. When the signatures match, the CDN can receive another request for content at 406.

Alternatively, when the signatures do not match, an alert can be generated, such as by creating a trouble ticket, to notify CDN support staff of a problem with the delivery of the content. In an embodiment, the alert may be sent to a centralized event tracking system. The download signature may not match the upload signature when a content object is stale, when there is a network problem that prevents the delivery of a content object, or any combination thereof. A content object may be stale when a new version of the content object has been provided by the content provider but has not propagated to the edge node providing the content to the client system. Preferably, CDN support staff can receive the alert substantially in real-time and can promptly correct the issue causing the difference between the upload signature and the download signature.

In an additional embodiment, the CDN can include one or more autodownloader systems. The autodownloader systems can be located throughout the CDN, such as close to the edge servers. The autodownloader system can periodically download content from the CDN, generate a download signature, and compare the download signature to the upload signature for the content. The autodownloader system can generate an alert, such as by creating a trouble ticket for the CDN support staff, when the download signature and the upload signature do not match. The autodownloader system can provide a quality assurance measure of the delivery of content even when users are not currently accessing the content.

In an embodiment, the autodownloader system can generate a screen capture image of the content. For video content, the autodownloader system can generate multiple screen capture images, preferably at a lower rate than the content, to verify that the video content can be played back correctly. The screen capture images can be provided to the CDN support staff to aid in resolving delivery issues or to the content provider to allow for verification of the quality of the CDN. Additionally, an audio capture may be provided when the content includes audio data.

Figure 5:
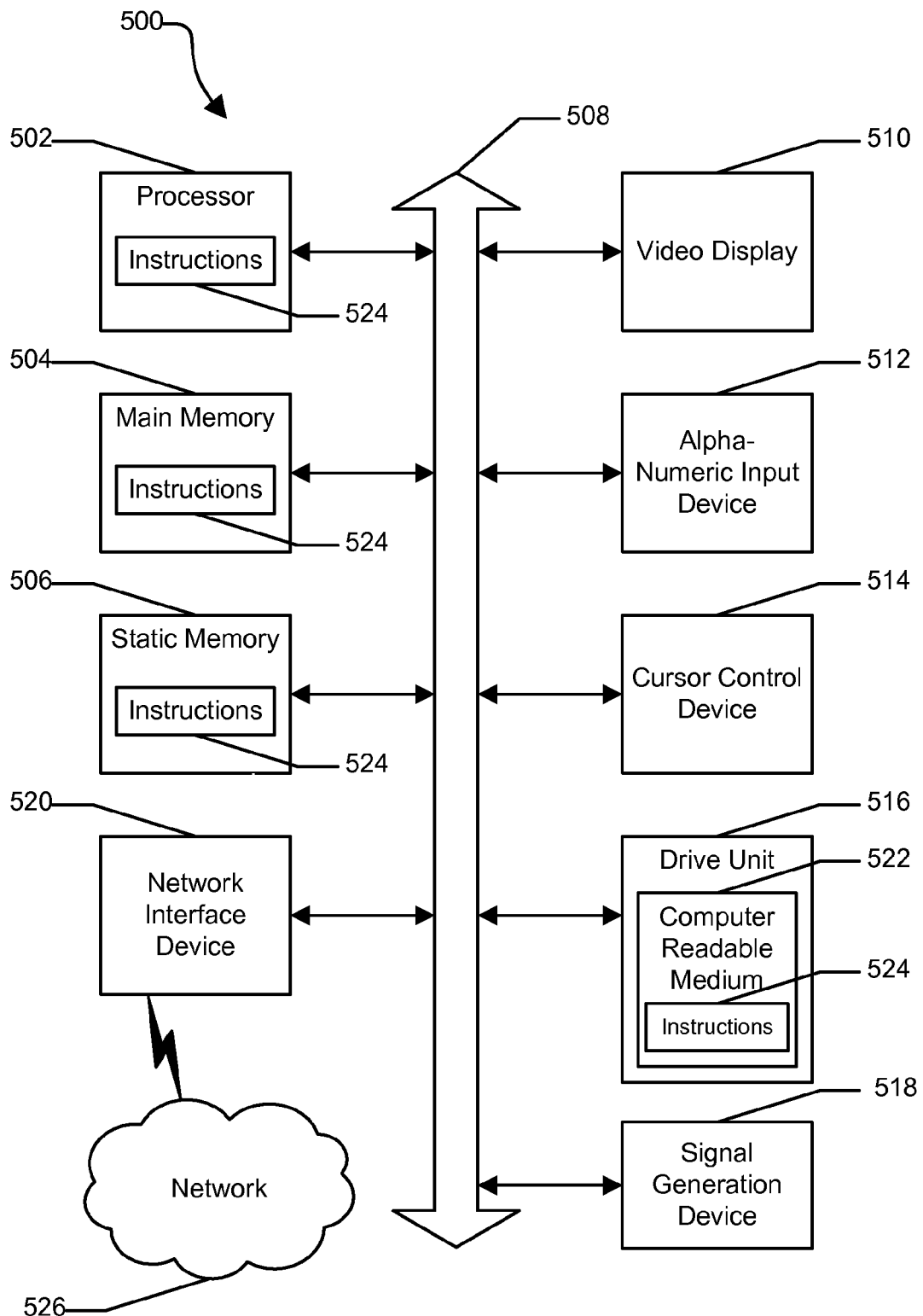
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid-state display, or a cathode ray tube (CRT). Additionally, the computer system 500 may include an input device 512 such as a keyboard, and a cursor control device 514 such as a mouse. Alternatively, input device 512 and cursor control device 514 can be combined in a touchpad or touch sensitive screen. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A content delivery system comprising:
   an upload module configured to:
     receive content from a content provider; and
     generate an upload signature for the content as received from the content provider, the upload signature including a hash of the content; and
   a content delivery module configured to:
     receive a request for the content from a client system; and
     provide the content to the client system; and
   a quality assurance module configured to:
     generate a download signature and a screen capture image of the content as delivered to the client;
     compare the upload signature and the download signature; and
     generate an alert when the upload signature and the download signature do not match.

2. The content delivery system of claim 1 wherein the client system is an autodownloader configured to periodically request content from the content delivery system.

3. The content delivery system of claim 1 wherein the content includes video content and the screen capture image if the content includes a series of screen capture images of the video content.

4. The content delivery system of claim 3 wherein the screen capture image is provided to the content provider.

5. The content delivery system of claim 1 wherein the upload signature further includes an embedded content object upload signature for an embedded content object of the content.

6. The content delivery system of claim 1 wherein the upload signature further includes a combined upload signature of a plurality of embedded content objects of the content.

7. The content delivery system of claim 1 wherein the upload signature further includes one of a size of the content, a length of play of the content, a format of the content, a location within a web page of the content, a digital watermark embedded in the content, and any combination thereof.

8. A computer-readable medium comprising a plurality of instructions to manipulate a processor, the plurality of instructions comprising:
   instructions to generate a download signature and a screen capture image of the content as delivered to a client, the download signature including a hash of the content;
   instructions to compare an upload signature and the download signature, the upload signature representing the content as received from a content provider; and
   instructions to generate an alert when the upload signature and the download signature do not match.

9. The computer-readable medium of claim 8 wherein the instructions to generate screen capture image of the content include instructions to generate series of screen capture images when the content includes video content.

10. The computer-readable medium of claim 9 wherein the screen capture image is provided to the content provider.

11. The computer-readable medium of claim 8 wherein the download signature further includes a download signature for an embedded content object of the content.

12. The computer-readable medium of claim 8 wherein the download signature further includes a combined download signature of a plurality of embedded content object of the content.

13. The computer-readable medium of claim 8 wherein the download signature further includes one of a size of the content, a length of play of the content, a format of the content, a location within a web page of the content, a digital watermark embedded in the content, and any combination thereof.

14. An edge server comprising:
   a processor configured to:
     receive a request for the content from a client system;
     provide the content to the client system;
     generate a download signature for the content as delivered to the client, the download signature including a hash of the content and a combined download signature of a plurality of embedded content objects of the content;
     compare an upload signature and the download signature, the upload signature representing the content as received from a content provider; and
     generate an alert when the upload signature and the download signature do not match.

15. The edge server of claim 14 wherein the download signature further includes a size of the content, a length of play of the content, a format of the content, a location within a web page of the content, a digital watermark embedded in the content, or any combination thereof.

16. A quality assurance device comprising:
a processor configured to:
receive content from a content distribution network;
generate a download signature for the content, the download signature including a hash of the content and a hash of an embedded content object of the content;
compare an upload signature and the download signature, the upload signature representing the content as received by the content distribution network from a content provider; and
generate an alert when the upload signature and the download signature do not match.

17. The quality assurance device of claim 16, wherein the download signature further includes a combined download signature of a plurality of embedded content object of the content.

18. The quality assurance device of claim 16, wherein the download signature further includes one of a size of the content, a length of play of the content, a format of the content, a location within a web page of the content, a digital watermark embedded in the content, and any combination thereof.

19. A computer-readable medium comprising a plurality of instructions to manipulate a processor, the plurality of instructions comprising:
instructions to receive content from an edge server of a content distribution network;
instructions to generate a download signature and a screen capture image of the content, the download signature including a hash of the content; and
instructions to provide the download signature to a quality assurance device of the content distribution network.

20. The computer-readable medium of claim 19, wherein the download signature further includes a download signature for an embedded content object of the content.

21. The computer-readable medium of claim 19, wherein the download signature further includes a combined download signature of a plurality of embedded content object of the content.

22. The computer-readable medium of claim 19, wherein the download signature further a size of the content, a length of play of the content, a format of the content, a location within a web page of the content, a digital watermark embedded in the content, or any combination thereof.

* * * * *